(12) United States Patent
Hasegawa et al.

(10) Patent No.: US 9,025,261 B1
(45) Date of Patent: May 5, 2015

(54) WRITING AND READING DATA IN TAPE MEDIA

(71) Applicant: International Business Machines Corporation, Armonk, NY (US)

(72) Inventors: Tohru Hasegawa, Tokyo (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/082,565

(22) Filed: Nov. 18, 2013

(51) Int. Cl.
*G11B 5/00* (2006.01)
*G11B 20/00* (2006.01)

(52) U.S. Cl.
CPC .................................. *G11B 20/00007* (2013.01)

(58) Field of Classification Search
None
See application file for complete search history.

(56) References Cited

U.S. PATENT DOCUMENTS

| | | | | |
|---|---|---|---|---|
| 4,562,577 A * | 12/1985 | Glover et al. | ................. | 714/769 |
| 6,314,391 B1 * | 11/2001 | Tsutsui et al. | ................ | 704/214 |
| 7,386,046 B2 * | 6/2008 | Fallon et al. | ................... | 375/240 |
| 7,496,696 B2 * | 2/2009 | Katagiri et al. | ................ | 710/29 |
| 7,991,930 B2 * | 8/2011 | Martin | ............................ | 710/68 |
| 8,412,891 B2 * | 4/2013 | Demura et al. | ............... | 711/151 |
| 8,473,645 B2 * | 6/2013 | Jibbe et al. | ....................... | 710/33 |
| 8,719,438 B2 * | 5/2014 | Fallon | ........................... | 709/231 |
| 2008/0162813 A1 * | 7/2008 | Haustein et al. | .............. | 711/115 |
| 2008/0285166 A1 * | 11/2008 | Katagiri et al. | ................ | 360/47 |
| 2010/0095029 A1 * | 4/2010 | Katagiri et al. | ................ | 710/52 |
| 2012/0331191 A1 * | 12/2012 | Pell et al. | ........................ | 710/68 |
| 2014/0013068 A1 * | 1/2014 | Yamato et al. | ............... | 711/154 |

* cited by examiner

*Primary Examiner* — Dismery Mercedes
(74) *Attorney, Agent, or Firm* — Francis Lammes; Stephen J. Walder, Jr.; Randall J. Bluestone

(57) ABSTRACT

A mechanism is provided for determining storage device speed based on a ratio of data compression. A bandwidth (B) is identified between a storage device accessing storage medium and a host application requesting access to data on the storage medium. A host side transfer rate is identified, where the host side transfer rate (HSTR) is a rate of data transfer between the host application and the storage device. For each data set in a set of data sets of a record, a ratio of data compression (R) is identified for the data set; a compression considered host side transfer rate (CCHSTR) is determined; and the storage device speed is set to the compression considered host side transfer rate (CCHSTR) for transmitting the data set to the host application.

20 Claims, 9 Drawing Sheets

WRITING AND READING DATA IN TAPE MEDIA

BACKGROUND

The present application relates generally to an improved data processing apparatus and method and more specifically to mechanisms for determining magnetic tape speed based on a ratio of data compression.

Linear storage media may include magnetic tape storage, such as the Linear Tape-Open (LTO). In general, data is stored on linear storage tape in blocks of fixed or variable size. Managing data blocks on linear storage tape may be done in various ways, such as using the Tape Archive Format (TAR), a data backup system, a data storage system, as well as a file system on tape. The Linear Tape File System (LTFS) is a file system that allows a user to store individual files to a tape, in the same manner as files are stored on other file-based storage device, such as a hard disk, a FLASH memory, a Solid State Drive (SSD), or any other conventional file storage medium. To use a tape cartridge with LTFS, the cartridge has to first be formatted, similar to formatting of hard drives. A formatted tape may be loaded into a drive, mounted by LTFS as a file system, and then be accessed and used to store and retrieve files.

Magnetic tape drives however, have a slow access time and behave very differently than these other storage devices. When reading a file, the magnetic tape drive has to seek to the file location before the reading of the file may occur. This seek operation may take anywhere from seconds to minutes depending on the file location on the tape relative to the current position of the tape.

SUMMARY

In one illustrative embodiment, a method, in a data processing system, is provided for determining storage device speed based on a ratio of data compression. The illustrative embodiment identifies a bandwidth (B) between a storage device accessing storage medium and a host application requesting access to data on the storage medium. The illustrative embodiment identifies a host side transfer rate, where the host side transfer rate (HSTR) is a rate of data transfer between the host application and the storage device. For each data set in a set of data sets of a record, the illustrative embodiment identifies the ratio of data compression (R) for the data set; determines a compression considered host side transfer rate (CCHSTR); and sets the storage device speed to the compression considered host side transfer rate (CCHSTR) for transmitting the data set to the host application.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Magnetic tape drives have a slow access time and behave differently than these other storage devices. When reading a file, the magnetic tape drive has to seek to the file location before reading of the file may occur. This seek operation may take anywhere from several seconds to a few minutes depending on the file location on the tape relative to a current position of the magnetic tape, which hereinafter is referred to simply as tape. Data that is written to or read from the tape is accessed by a unit of data referred to as a "record." While the length of a record may vary, in general, the maximum length of a record is approximately 1 MB, though this maximum length depends on environmental factors, such as an operating system (OS) environment, tape drive, or the like. A tape drive receives a record sent from a host and restructures the received data into data that is in a format of a fixed length. This fixed-length format data may be referred to as a "data set." Thus, each record may be comprised within one or more data sets. When data is written to the tape medium, the data-write operation is performed in a unit of the data set.

Figure 1:
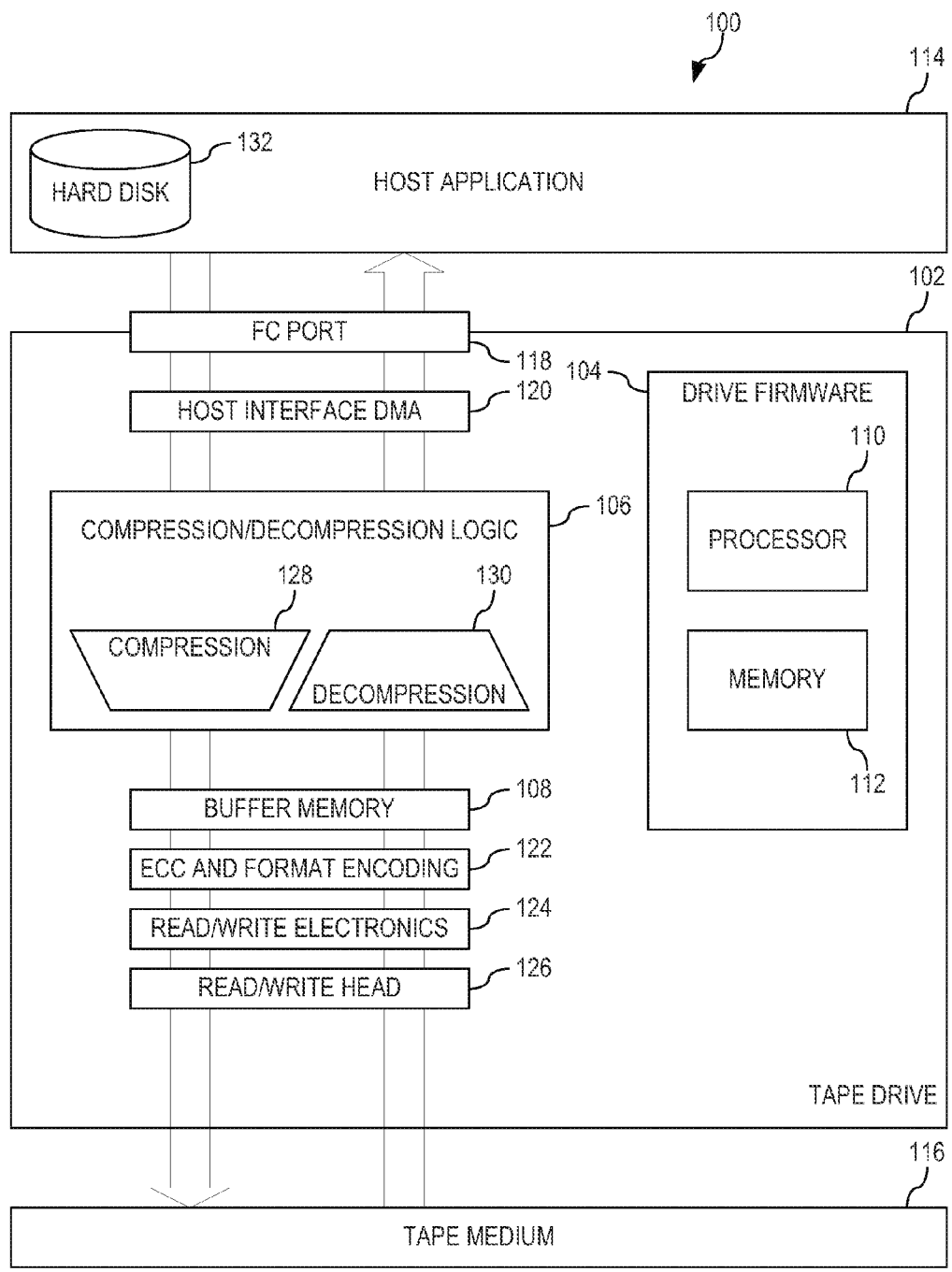
FIG. 1 illustrates a tape drive in accordance with an illustrative embodiment.

FIG. 1 illustrates a tape drive in accordance with an illustrative embodiment. Tape drive 102 in data processing system 100 comprises drive firmware 104, compression/decompression logic 106, and buffer memory 108. Drive firmware 104 comprises processor 110 and memory 112, which is coupled to processor 110. Memory 112 comprises instructions that, when executed by the processor, cause the process to perform various operations when requested by host application 114. Buffer memory 108 has buffering capacity that provides for the absorption of a data that is a difference between the rate of data transfer between host application 114 and tape drive 102 (hereinafter referred to as "the rate of transfer at the host side") and the rate of data transfer between tape drive 102 and tape medium 116 (hereinafter referred to as "the rate of transfer at the medium side"). For example, when host application 114 executes a data-write operation, tape drive 102 receives the requested command and the data via fibre channel (FC) port 118 and host interface direct memory access (DMA) 120. Processor 110 analyzes the requested command for execution and temporarily stores the data in buffer memory 108. After the temporary storage of the data, processor 110 moves the data from buffer memory 108 to tape medium 116 via error-correcting code (ECC) and format encoding 122, read/write electronics 124, and read/write head 126. In general, buffer memory 108 may be divided into areas called "segments," which each have a capacity of a few or several megabytes. In tape drive technology, there is one-to-one correspondence between a segment in buffer memory 108 and a data set stored on tape medium 116. Tape drive 102 determines the rate of transfer at the host side and the rate of transfer at the medium side based the capacity of the data set and the time intervals of the writing/reading of the data set.

In most of cases, the rate of transfer at the host side does not agree with the rate of transfer at the medium side. If the rate of transfer at the host side is higher than the rate of transfer at the medium side when a data-write operation is performed, buffer memory 108 may become fully occupied with pieces of data that have been sent from the host and are in a queue waiting to be written to the tape medium 116. If buffer memory 108 becomes full, host application 114 is forced to wait until a buffering space becomes available in buffer memory 108. Alternatively, if the rate of transfer at the medium side is higher than the rate of transfer at the host side when the data-write operation is performed, buffer memory 108 may become empty. If buffer memory 108 becomes empty, normally, tape drive 102 performs a process referred to as "back hitching," which is the rewinding of the tape medium. While back hitching only takes a few seconds, during the execution of back hitching, tape drive 102 may not write data to tape medium 116 or read data out of tape medium 116. If the capacity of buffer memory 108 is sufficiently large in comparison with the tape speed and the acceleration of the tape medium, even in the case of the occurrence of back hitching during the writing of data, buffer memory 108 will never become full during the execution of the back hitching and, thus, the rate of transfer at the host side will not be affected by the back hitching. On the other hand, if the capacity of buffer memory 108 is relatively small, buffer memory 108 will become full at each occurrence of back hitching. Since buffer memory 108 is full, there occurs periods of time during which it is not possible to accept any write request from host application 114, resulting in a long-term decrease in the rate of transfer spanning in time from before the back hitching to after the back hitching.

As stated previously, tape drive 102 also comprises compression/decompression logic 106. In a write operation, compression engine 128 compresses data sent from host application 114, which is then stored in buffer memory 108. Then, as described previously, processor 110 writes the compressed data to the tape medium 116 without being decompressed. In a read operation, processor 110 reads compressed data from tape medium 116 into buffer memory 108. Decompression engine 130 then decompresses the compressed data and processor 110 sends the data on to host application 114. This means that the rate of transfer from the buffer memory to data compression/decompression logic 106 is different from the rate of transfer from data compression/decompression logic 106 to host application 114. For example, data whose volume is reduced to 1/10 by compression, there is a difference of 10 between the rate of transfer at the host side and the rate of transfer at the medium side. However, the data that is written to and read from tape medium 116 may be compressed at different compression ratios such that a text file may be able to be compressed more than an image file. Thus, the ratio of compression for a set of files may be irregular and/or not uniform. Since the rate of transfer at the host side is utilized for keeping a balance with the rate of transfer at the medium side in order to avoid a buffer-full state and a buffer-empty state, the illustrative embodiments define a new rate of transfer at the host side as the rate of transfer between buffer memory 108 and compression/decompression logic 106.

That is, current "speed matching" techniques keep the rate of transfer at the host side as high as possible in order to shorten the waiting period of host application 114 as much as possible. In this technique, tape drive 102 determines the tape speed on the basis of the history of the rate of transfer at the host side. If tape drive 102 attempts to adjust the rate of transfer at the medium side to the rate of transfer at the host side each time a change in the rate of transfer at the host side is identified, back hitching occurs, which makes the time of writing data to tape medium 116 and the time of reading data out of tape medium 116 relatively short. For this reason, as a common approach, at a point in time (timing) at which back hitching occurs due to the occurrence of an empty state of buffer memory 108 or a full state of buffer memory 108, tape device 102 determines the running speed for tape medium 116 based on a weighted average of pieces of the historical data of the rate of transfer at the host side.

The bottleneck of the rate of transfer at the host side may be roughly divided into the following three causes and factors:
  The rate of transfer from/to tape medium 116 (Max. 250 MB/sec for TS1140);
  The bandwidth between host application 114 and tape drive 102 (800 MB/sec for Fibre Channel (FC) connection of 8 Gbps); and
  The speed of data processing by host application 114 using tape drive 102 (restrictions caused by the CPU/memory/HDD, etc. associated with host application 114).
Since the ratio of data compression is not taken into consideration in speed matching, when data whose ratio of compression is irregular and/or not uniform is read or written, despite the fact that the speed of data processing by host application 114 using tape drive 102 is constant, the rate of transfer at the host side fluctuates, making determining an optimum speed for the speed matching impossible.

Thus, the illustrative embodiments provide a mechanism for determining a running speed for tape medium 116 based on a ratio of data compression, which addresses current issues where the ratio of compression of data is irregular and/or not uniform. That is, the illustrative embodiments calculate a ratio of data compression and use the calculated ratio of data compression to redefine of the rate of transfer at the host side.

Additionally, since the rate of transfer at the host side is most often greater than the rate of transfer at the medium side, the illustrative embodiments also takes into consideration the hierarchical structure of storage between host application 114 and tape medium 116. That is, hierarchical storage is a technique for storage management on a hierarchical basis by combining a plurality if storage devices with one another and virtually putting them together into one, wherein the capabilities of the plurality of storage devices are different from one another. For example, the combination of a hard disk 132 associated with host application 114 and tape medium 116 associated with tape drive 102. Hierarchical storage makes it possible for a user to manually and consciously manipulate a location where data is to be placed depending on the characteristics of the devices. In addition, hierarchical storage makes it possible to automatically move and change a location where data is to be placed by a hierarchical storage function. A hierarchical storage system is used for the purpose of, for example, placing data that is used more frequently than other data at a more expensive storage device, such as hard disk 132, which offers a relatively high rate (speed) of transfer, and placing data that is used less frequently at a less expensive storage device, such as tape medium 116, which offers a relatively low rate of transfer.

As stated previously, data that is written to and read from tape medium 116 may be compressed at different compression ratios such that a text file may be able to be compressed more than an image file. In a case where data that cannot be compressed or data whose volume cannot be reduced efficiently even when compressed is written or read, for example, in a case where the data of a moving-image file is written or read, the maximum rate of transfer is relatively low. This is attributable to the recording density of tape medium 116 and the running speed of tape drive 102. On the other hand, in a case where data that has a high ratio of compression is written or read, for example, in a case where the data of a text file is written or read, it is possible to perform a read operation at a data transfer rate that is more than twice as high as a data transfer rate at which a file that cannot be compressed is written or read. That is, tape drive 102 has characteristics that its rate of transfer varies depending on the content of data that is written or read.

Existing hierarchical storage systems perform management with regard to hierarchy of performance on a device-by-device basis. Currently, a change in performance depending on the content of data is not taken into consideration. That is, in a case where a tape drive is used, the illustrative embodiments provide an additional mechanism that takes into consideration not only the compression ratio but also a change in performance depending on the content of data.

Further, in addition to calculating a ratio of compression each time a data set of a file is written to tape medium 116, the illustrative embodiments provide for storing a value of the compression ratio for each data set of the file. Tape drive 102 may store these values in memory 112 which are then written to tape medium 116 at the time of dismounting of tape medium 116 as well as load these values into memory 112 at the time of mounting of tape medium 116. However, even with tape drive 102 storing the ratio of compression for each data set at the time of the writing of data, with the recording of such a huge number of data sets per a tape medium taken into consideration, it is not practical to make reference to the ratio of compression for each data set both from the viewpoint of the capacity of memory 112 and from the viewpoint of time that is required for reading out data on the rate of compression at the time of making reference. That is, changing the running speed for tape medium 116 based on a ratio of data compression for each data set may not be practical.

Thus, the illustrative embodiments provide a mechanism for determining whether a file is written over a plurality of data sets. If the file is only comprised within one data set, then the mechanism utilizes the ratio of data compression for that data set in determining the running speed for tape medium 116. However, if the file is comprised within more than one data set, the mechanism utilizes an average of the ratios of data compression for those data sets in determining the running speed for tape medium 116. In order to determine whether a file is comprised within more than one data set, tape drive 102 may determine a head (start) position of the file and a tail (end) position of the file as written to tape medium 116 using longitudinal position (lpos) information that is recorded in the servo bands of tape medium 116.

In addition to determining an average of the ratios of data compression for those data sets that make up a particular file, a still further illustrative embodiment provides a mechanism that utilizes the lpos associated with the head position and the tail position of a particular file in reclamation of tape medium 116. That is, as files are changed or deleted from tape medium 116, part of data recorded in tape medium 116 becomes unusable. As more and more of tape medium 116 becomes unusable due to changed or deleted files, the illustrative embodiments utilize a process referred to as reclamation to reinitialize or decommission tape medium 116 after the moving the remaining valid data to another tape medium. As an entire file is deleted or a portion of a file is deleted, the portion of tape medium 116 identified by the head position and tail position associated with the deleted portion/file is subtracted from the overall capacity of tape medium 116. When the deleted portion of tape medium 116 exceeds a predetermined threshold that represents a decreased efficiency in operating tape medium 116, in the illustrative embodiments, the mechanism provides an indication to perform a reclamation process.

Figure 2:
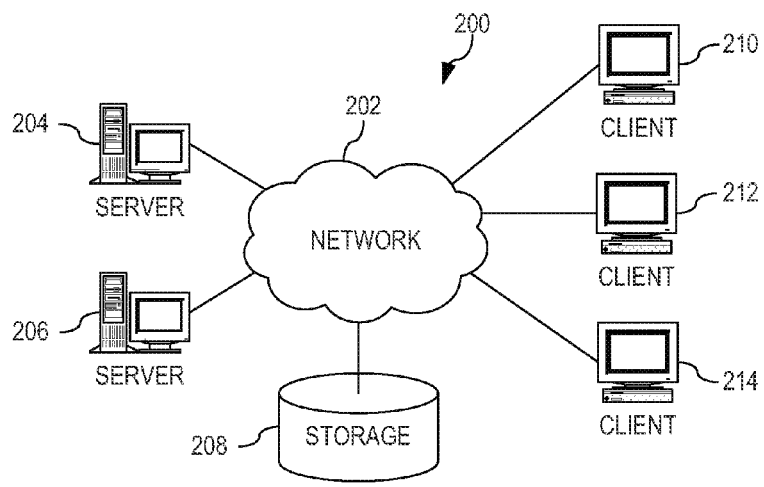
FIG. 2 is an example diagram of a distributed data processing system in which aspects of the illustrative embodiments may be implemented.
Figure 3:
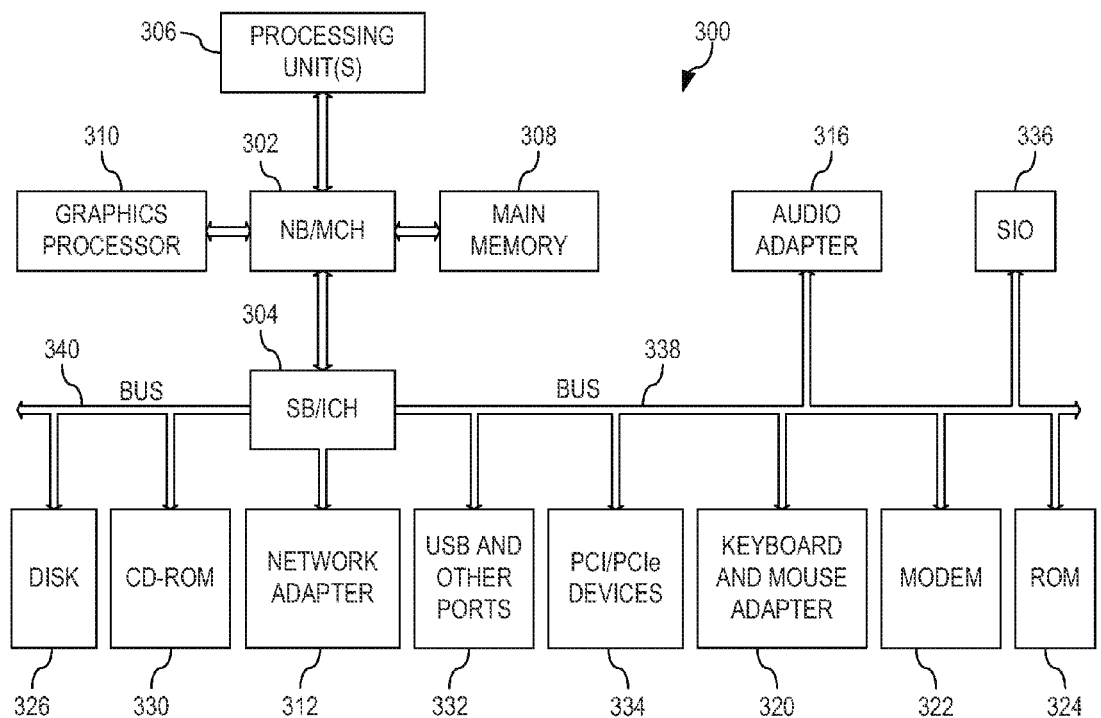
FIG. 3 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, tape drives, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

FIG. 3 is a block diagram of an example data processing system in which aspects of the illustrative embodiments may be implemented. Data processing system 300 is an example of a computer, such as client 210 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System p® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
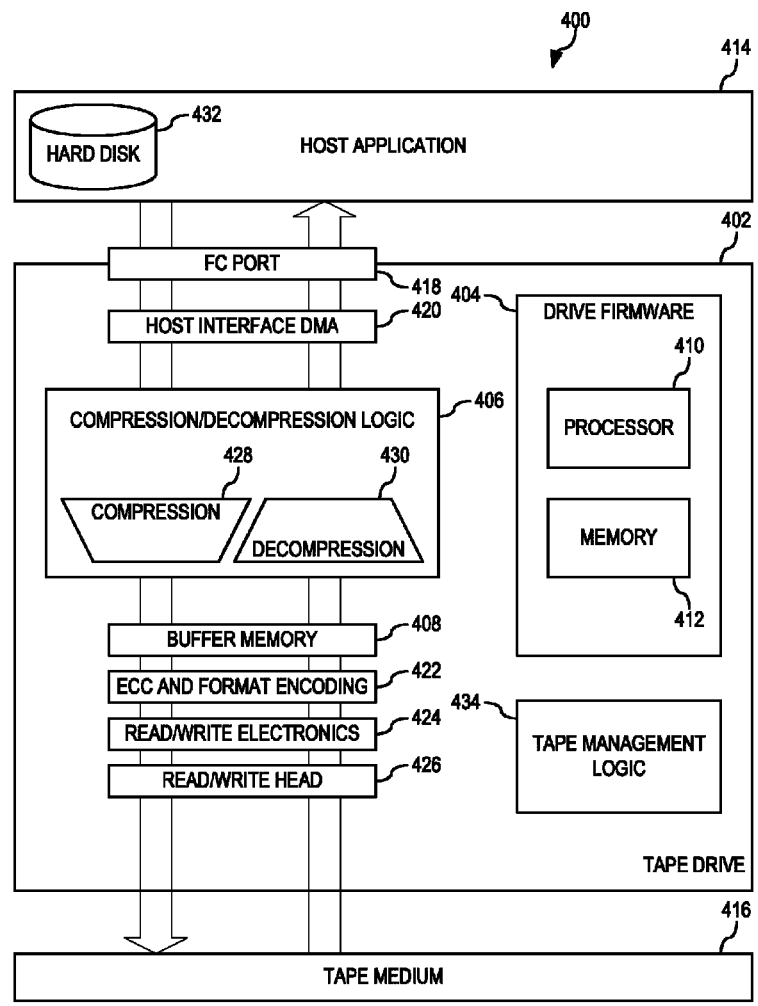
FIG. 4 depicts a function block diagram of a tape drive that incorporates a tape management mechanism in accordance with an illustrative embodiment.

Again, the illustrative embodiments provide mechanisms for determining a running speed for a tape medium based on a ratio of data compression, adjusting the running speed for a tape medium based not only on the ratio of data compression but also a change in performance depending on the content of data, adjusting the running speed for a tape medium based on whether a file is written over a plurality of records, and reclaiming the tape medium when an unusable portion of the tape medium exceeds a predetermined threshold. FIG. 4 depicts a function block diagram of a tape drive that incorporates these mechanisms in accordance with an illustrative embodiment.

With reference to FIG. 4, exemplary data processing system 400 includes, in addition to the elements particular to the illustrative embodiments, elements that are similar to elements depicted in data processing system 100 of FIG. 1. Thus, elements in FIG. 4 that are not specifically described as operating differently from elements in FIG. 1 are intended to operate in a similar manner as their corresponding elements in FIG. 1. For example, in data processing system 400, tape drive 402 comprises drive firmware 404, compression/decompression logic 406, and buffer memory 408. Drive firmware 404 comprises processor 410 and memory 412, which is coupled to processor 410. Memory 412 comprises instructions that, when executed by the processor, cause the process to perform various operations when requested by host application 414. Drive firmware also comprises tape management logic 434.

In accordance with a first illustrative embodiment, tape management logic 434 calculates a ratio of data compression for each data set written to tape medium 416. For this reason, each time host application 414 requests a read of a record from tape medium 416 or a write of a record to tape medium 416, when the record passes through compression/decompression logic 406, tape management logic 434 compares the data length of each data set of the record after passing through compression/decompression logic 406 to an associated one of the data length of each data set of the record before passing through compression/decompression logic 406. Thus, for each data set, tape management logic 434 calculates a ratio of compression for each data set. When a record extends over a plurality of data sets, as a matter of course, tape management logic 434 calculates a ratio of data compression for each data set on the basis of before-compression length versus after-compression length of the record.

Thus, instead of solely using the host side transfer rate (HSTR) that has been used conventionally to determine the running speed for tape medium 416, tape management logic 434 uses the ratio of data compression R in addition to the host side transfer rate (HSTR) to determine the running speed for tape medium. That is, tape management logic 434 determines a compression considered host side transfer rate (CCHSTR) utilizing the following formula:

$$CCHSTR=\max(B,HSTR/R)$$

where HSTR is a host side transfer rate, R is a ratio of data compression, and B is a bandwidth between host application 414 and tape drive 402. That is, tape management logic 434 sets the running speed for tape medium 416 to the maximum of either the bandwidth between host application 414 and tape drive 402 or the quotient of dividing the host side transfer rate by the ratio of data compression. Thus, tape management logic 434 takes into consideration the rate of transfer at the host side set with the ratio of data compression by dividing the rate of transfer at the host side per each data set by the ratio of data compression of the data set. Tape management logic 434 may store each of these ratios of data compression in memory 412 which are then written to tape medium 416 at the time of dismounting of tape medium 416 as well as load these values into memory 412 at the time of mounting of tape medium 416. Tape management logic 434 may store this data on tape medium 416 in cartridge memory (CM), into a Data Set Information Table (DSIT), as End of Data (EOD) that is a special data set written on a tape medium, into House Keeping Data Set (HKDS), or the like.

Thus, prior to the current illustrative embodiments, where the ratio of data is not taken into consideration, the rate of transfer at the host side during a read may look to be low when data whose ratio of data compression is high. While this may not matter so much when the ratio of data compression is constant, as the ratio of data compression decreases, the problem of the selection of a low tape running speed, which is slower than necessary, comes to the surface. As the ratio of data compression increases, a high tape running speed that is faster than necessary is selected. As the result of the selection of such a high tape running speed, problems arise such as a frequent occurrence of back hitching due to the transition of the state of the buffer memory into its memory-empty state at the time of writing and the transition of the state of the buffer memory into its memory-full state at the time of reading occurs. By tape management logic 434 using the rate of transfer at the host side set with the ratio of data compression, even in a case where data whose ratio of data compression is irregular and not uniform, tape management logic 434 is able to select an appropriate speed for the running of tape medium 416 without being affected by fluctuations in the ratio of data compression.

In accordance with a second illustrative embodiment, tape management logic 434 also takes into consideration the content of the data being read from tape medium 416 prior to transmitting data to host application 414 and, more specifically, hard disk 432 associated with host application 414. That is, when host application 414 requests data to be read from tape medium 416 onto hard disk 432, tape management logic 434 only transmits the data or portions of the data when there is enough data to efficiently utilize hard disk 432 and the bandwidth between host application 414 and tape drive 402. The process of moving a part of a file or a whole of the file that is located on tape medium 416 onto hard disk 432 is referred to as "recall."

As differences between the performance/capability of hard disk 432 and the performance/capability of tape drive 402, a data transfer rate and seek time (time that is required for locating the start of a data sequence) are known. Let T be the rate of data transfer at the medium side, let S be data seek time, and let C be the capacity (volume) of data. Given these definitions, tape management logic 434 determines a time X that is required for reading data out of tape medium 416, using the following equation:

$$X=S+C/T.$$

Further, let Th be the rate of transfer by a hard disk (disk sub system that includes the hard disk), let Tt be the highest rate of transfer of data that cannot be compressed on tape medium 416, and assume that a relationship of Th>Tt holds true. Let Tm be the rate of transfer of data that has a very high tape-drive compression ratio and further assume that a relationship of Th=Tm holds true. The above assumption is based on the fact that the rate of transfer is limited to 800 MB/sec due to interface restrictions when fiber channel (FC) connection of 8 Gbps is established, that is, Th=Tm=800 MB/sec. Therefore, the above assumption is not unnatural.

With these values, tape management logic 434 determines whether the rate of transfer by a hard disk is less than or equal to the highest rate of transfer of data that cannot be compressed on tape medium 416 when divided by the ratio of data compression R for the particular data set using the following equation:

$$Th<Tt/R.$$

If tape management logic 434 determines that this condition is true, then it is safe to say that there is no substantial difference between data transfer time that is taken for reading out data when the data is located on hard disk 432 and data transfer time that is taken for reading out data when the data is located on tape medium 416. This is because, if Tm<Tt/R, it is not possible to perform data transfer at the rate of transfer that is higher than Tm because of the restrictions of the interface.

Let Sh be the maximum time of the seeking of data by hard disk 432, let St be the maximum time of the seeking of data by tape drive 402, and assume that a relationship of Sh<St holds true. With a focus on time that is required for reading out data from tape medium 416 and reading data from hard disk 432, tape drive 402 may skip recall processing if tape management logic 434 determines that the following equation does not hold true:

$$Sh+(C/Th)<St+(C/(Tt/R)).$$

If tape management logic 434 determines that the previous equation does not hold true, the percentage of use of hard disk 432 is reduced. However, since data associated with a record is not always within a single data set, in order to maintain a same level of performance/capability as that of existing techniques or higher both in terms of seek time and the rate of transfer, the use of the previous equation only is not sufficient. This is because Sh<St.

In order to maintain a same level of performance/capability as that of existing techniques or higher both in terms of seek time and the rate of transfer, data divided into a plurality of data sets are considered individually. Thus, when a record is read that is comprised over a plurality of data sets, tape management logic 434 reads the first/leading data set out of tape medium 416 and transmits this data set to hard disk 432. After the first/leading data set is read out, tape management logic 434 reads out data sets for which the following equation holds true:

$$Th>Tt/Rd.$$

Note that, in this equation, the ratio of compression for any arbitrary data set is denoted as Rd.

If tape management logic 434 determines that the previous equation does not hold true, then tape management logic 434 determines whether the maximum time of the seeking of data on hard disk 432 (Sh) when added to the capacity (volume) of data associated with a particular data set (Cd) divided by the rate of transfer by hard disk 432 (Th) is greater than the maximum time of the seeking of data by tape drive 402 (St) as is shown in the following equation:

$$Sh+(Cd/Th)>St.$$

If tape management logic 434 determines that the previous equation holds true, then tape management logic 434 reads out the next data set and does not transmit any data to hard disk 432. However, if tape management logic 434 determines that the previous equation does not hold true, then tape management logic 434 reads out the current data set and any previous non-read out data sets to hard disk 432.

Thus, as opposed to current implementations of reading out data from a tape medium, such as tape medium 416, tape management logic 434 not only takes into consideration the ratio of data compression but also the content of data, i.e., the capacity (volume) of data, the seek time, the rate of transfer.

In accordance with a third embodiment, tape management logic 434 determines whether a record is written over a plurality of data sets and adjusts the speed of running tape medium 416 based on an average of the ratios of data compression for the plurality of data sets over which the record is comprised. That is, in addition to tape management logic 434 calculating a ratio of compression each time a data set of a record is written to tape medium 416, tape management logic 434 stores a value of the compression ratio for each data set of the file in memory 412 which are then written to tape medium 416 at the time of dismounting of tape medium 416 as well as load these values into memory 412 at the time of mounting of tape medium 416. However, changing the running speed for tape medium 416 based on a ratio of data compression for each data set as described with the first embodiment may not be practical.

Thus, in addition to storing a value of the compression ratio for each data set of the file in memory 412, tape management logic 434 keeps a running sum of the compression ratio values (Rs) as well as incrementing a size counter associated with the record that indicates a size (length) of the record (L). Once tape management logic 434 has calculated and stored all of the individual ratios of data compression for all of the data sets associated with the record, tape management logic 434 determines a current average ratio of compression A for the record by dividing the sum of the compression ratio values (Rs) by the size of the record (L). As the record is changed either by adding to or deleting data from the record, tape management logic 434 also updates the average ratio of compression A by setting the current average ratio of compression to a temporary average ratio of compression (O), determining a size (length) of the data that is being added to (La) or deleted (Ld) from the current record, and the ratio of data compression (R) of the data that is being added or deleted. If data is being added, then tape management logic 434 determines a new current average ratio of compression A using the following formula:

$$A=(L*O+La*R)/(L+La).$$

If data is being deleted, then tape management logic 434 determines a new current average ratio of compression A using the following formula:

$$A=(L*O-Ld*R)/(L-Ld).$$

While the above example, Illustrates the determination of the current average ratio of compression A for the record at the time of writing to tape medium 416, tape management logic 434 may not perform this operation at the time of writing but at the time of reading. That is, tape management logic 434 may identify all of the ratios of data compression associated with the data sets of the particular records at the time of reading and calculate the current average ratio of compression A prior to decompressing any of the data sets.

Further, instead of using the weighted average by using the size (length) of the data associated with the record, the illustrative embodiments recognize that tape management logic 434 may use a simple average that divides the sum of the compression ratio values (Rs) by the number of data sets, where a size of the number of data sets associated with the record is constant. Finally, tape management logic 434 may store the current average ratio of compression A not only in memory 412 but also in tape medium 416 at the time of dismounting of tape medium 416. This current average ratio of compression A can then be read out of tape medium 416 into memory 412 at the time of mounting of tape medium 416. Tape management logic 434 may store this data on tape medium 416 in cartridge memory (CM), into a Data Set Information Table (DSIT), as End of Data (EOD) that is a special data set written on a tape medium, into House Keeping Data Set (HKDS), or the like.

As is described previously, data may be written to as well as deleted from tape medium 416. In all of this writing, amending, deleting, and the like, much of tape medium 416 may become unusable. Thus, there is a point where tape medium 416 should be reclaimed. Therefore, in a fourth embodiment, tape management logic 434 also provides an indication of a process referred to as reclamation to reinitialize or decommission tape medium 416.

As was also described previously, a position on tape medium 416 may be uniquely determined on the basis of the value of wrap and the value of longitudinal position (lpos) of the head of the tape drive 402. Tape management logic 434 may acquire the value of the wrap and the value of longitudinal position (lpos) of the head of the tape drive 402 by executing a Request Sense command. Let Ws be the wrap of the head (start) of the record, Ps be the lpos of the head (start) of the record, We be the wrap of the tail (end) of the record, and Pe be the lpos of the tail (end) of the record. Given these definitions, an area Z that is occupied by the record on tape medium 416 may be calculated using the following set of equations:

If $Ws=We$, then $Z=|Pe-Ps|$

If $Ws \neq We$, then $Z=|f(Ws)-Ps|+|f(We)-Pe|+(f(0)-f(1))*(We-Ws-1)$ where f(Ws) is a function of the starting wrap position, f(We) is a function of the ending wrap position, f(0) is a function that returns the longitudinal position (lpos) corresponding to a beginning position on the tape medium when x is an even number, and f(1) is a function that returns the longitudinal position (lpos) corresponding to an end position on the tape medium when x is an odd number.

In order to determine the wrap and lpos at the tail of a record, tape management logic 434 requires that a record to have already been written to tape medium 416. If Tape medium 416 does not have a record written to it, tape drive 402 may perform the processing (sync) of writing data from buffer memory 408 to a tape medium 416 in a forcible manner by executing a SCSI command referred to as a Write Filemark.

Thus, when tape drive 402 receives a request to write a record to tape medium 416, tape management logic 434 determines whether a record-write position of the record agrees with a current position of where the tape head of tape drive 402 is reading tape medium 416. If the record-write position of the record fails to agree with a current position of where the tape head of tape drive 402 is reading tape medium 416, then tape management logic 434 issues a command to move tape medium 416 to line up with the record-write position of the record. Once the record-write position of the record agrees with a current position of where the tape head of tape drive 402 is reading tape medium 416, tape management logic 434 executes a Request Sense command to acquire the value of the wrap of the head (start) of the record (Ws) and the lpos of the head (start) of the record (Ps). Tape management logic 434 then causes the record to be written to tape medium 416 using a sync command (Write Filemark) so that data is written from buffer memory 408 to tape medium 416 in a forcible manner. Once the record is written to tape medium 416, tape management logic 434 executes a Request Sense command to acquire the value of the wrap of the tail (end) of the record (We) and the lpos of the tail (end) of the record (Pe). With these values, tape management logic 434 determines the area Z that is occupied by the record on tape medium 416. Tape management logic 434 then writes the value of area Z to an extended file attribute associated with the record as well as writing the value of area Z to a sum of areas Zt for all records written to tape medium 416.

If a record becomes fragmented by either adding or deleting portions of the record, the added or deleted portion is determined using the same methodology as writing a record for the first time, as illustrated above. Further, the added portion of the record is added to the sum of areas Zt for all records written to tape medium 416. As portions are deleted from a record or as the entirety of a record is deleted, that area Z associated with the deleted record or portion of record is added to a sum of areas deleted Ze for all records deleted from tape medium 416.

Therefore, over time, the data associated with any one record due to changes and/or deletions may extend over numerous portions of tape medium. Thus, the time it takes to access a filed over the numerous portions may increase the time required to access the record due to the movement to the tape head. In accordance with the present invention, tape management logic 434 may make two different determinations with regard to performing reclamation of tape medium 416. The first determination regards a single record. With regard to a single record, when the fragmented portions of the record, as determined by the extended file attributes indicting the start wrap (Ws), start lpos (Ps), end wrap (We) and end lpos (Pe) associated with each portion, indicates that the access time for each of the portions of the record is greater than a predetermined record access time threshold, tape management logic 434 may mark the associated record for reclamation, so that the individual file is reclaimed. Reclamation of a record is a process where the entire file is rewritten as one contiguous file to the same tape medium or a different tape medium.

The second determination is with regard to the entire tape medium 416 itself. As each record or portion of a record is added to or deleted from tape medium 416, tape management logic 434 determines whether the difference between the sum of areas Zt for all records written to tape medium 416 and the sum of areas Ze for all records deleted from tape medium 416 exceeds a predetermined tape medium reclamation threshold. That is, there may be a point where the amount of data deleted from tape medium 416 overly exceeds the amount of data remaining on tape medium 416 as determined by their respective areas. Once tape management logic 434 determined that this predetermined tape medium reclamation threshold is met, tape management logic 434 may mark tape medium 416 as a whole for the reclamation process, where all remaining files on tape medium 416 are written to a new tape medium 416.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
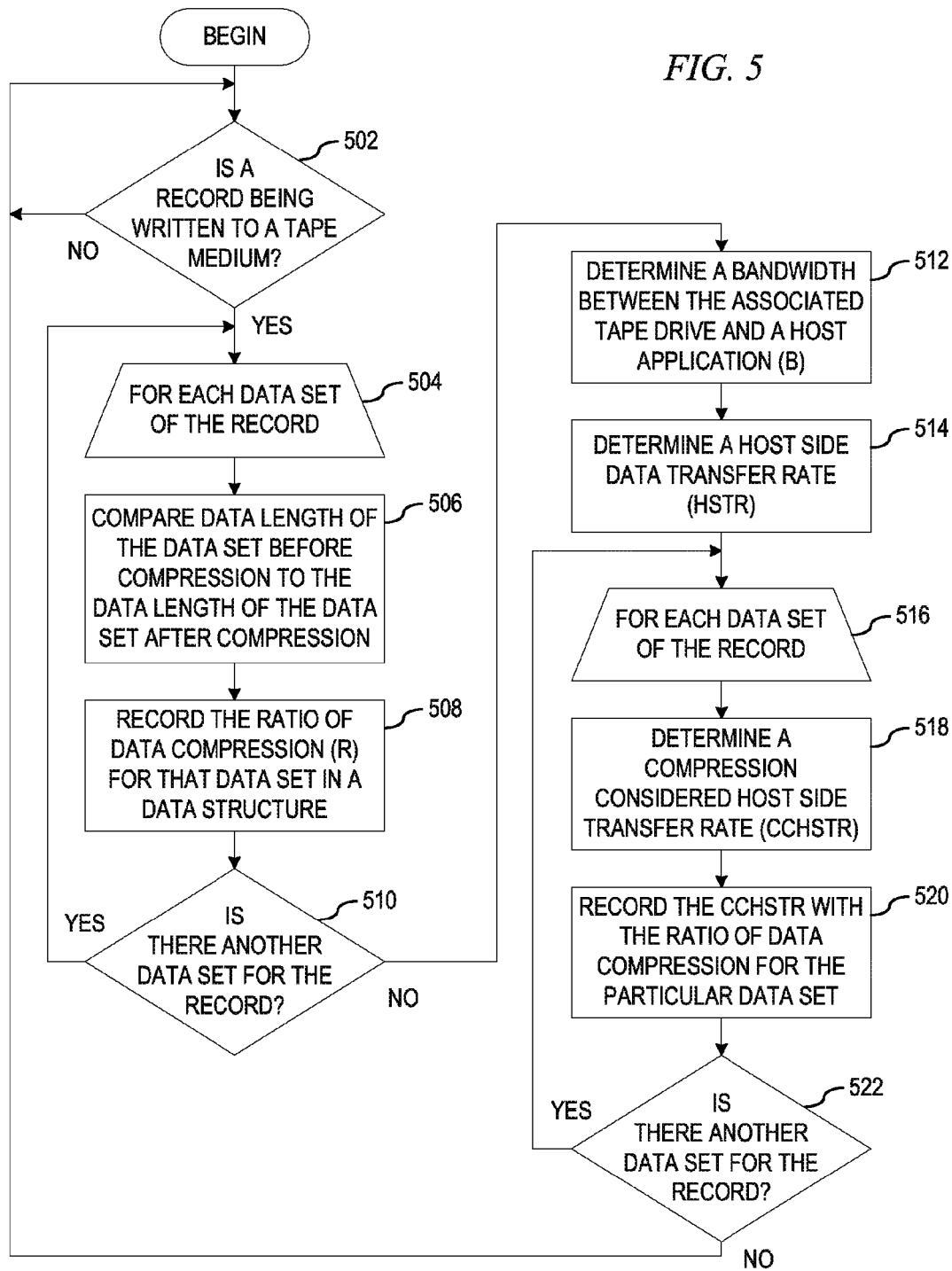
FIG. 5 depicts a flowchart of the operation performed by a tape management mechanism in determining a compression considered host side transfer rate (CCHSTR) for each data set of a record in accordance with an illustrative embodiment.

FIG. 5 depicts a flowchart of the operation performed by a tape management mechanism in determining a compression considered host side transfer rate (CCHSTR) for each data set of a record in accordance with an illustrative embodiment. As the operation begins, the tape management mechanism determines whether a record is being written to a tape medium (step 502). If at step 502 no record is being written to the tape medium, the operation returns to step 502. If at step 502 a record is being written to the tape medium, then, for each data set of the record (step 504), the tape management mechanism compares a data length of the data set before compression to the data length of the data set after compression (step 506). The tape management mechanism then records the ratio of data compression (R) for that data set in a data structure (step 508). The tape management mechanism then determines whether there is another data set associated with the record (step 510). If at step 510 there is another data set associated with the record, then the operation returns to step 504. If at step 510 there is not another data set associated with the record, then the tape management mechanism determines a bandwidth between the associated tape drive and a host application (B) (step 512) as well as a host side data transfer rate (HSTR) (step 514). Then for each data set of the record (step 516) written to the tape medium, the tape management system determines a compression considered host side transfer rate (CCHSTR) (step 518) utilizing the following formula:

$$CCHSTR=\max(B,HSTR/R)$$

where HSTR is a host side transfer rate, R is a ratio of data compression, and B is a bandwidth between the host application and the tape drive. The tape management mechanism then sets the tape speed for the tape medium to the determined CCHSTR (step 520). The tape management mechanism then determines whether there is another data set associated with the record (step 522). If at step 522 there is another data set associated with the record, then the operation returns to step 516. If at step 522 there is not another data set associated with the record, the operation returns to step 502.

Figure 6:
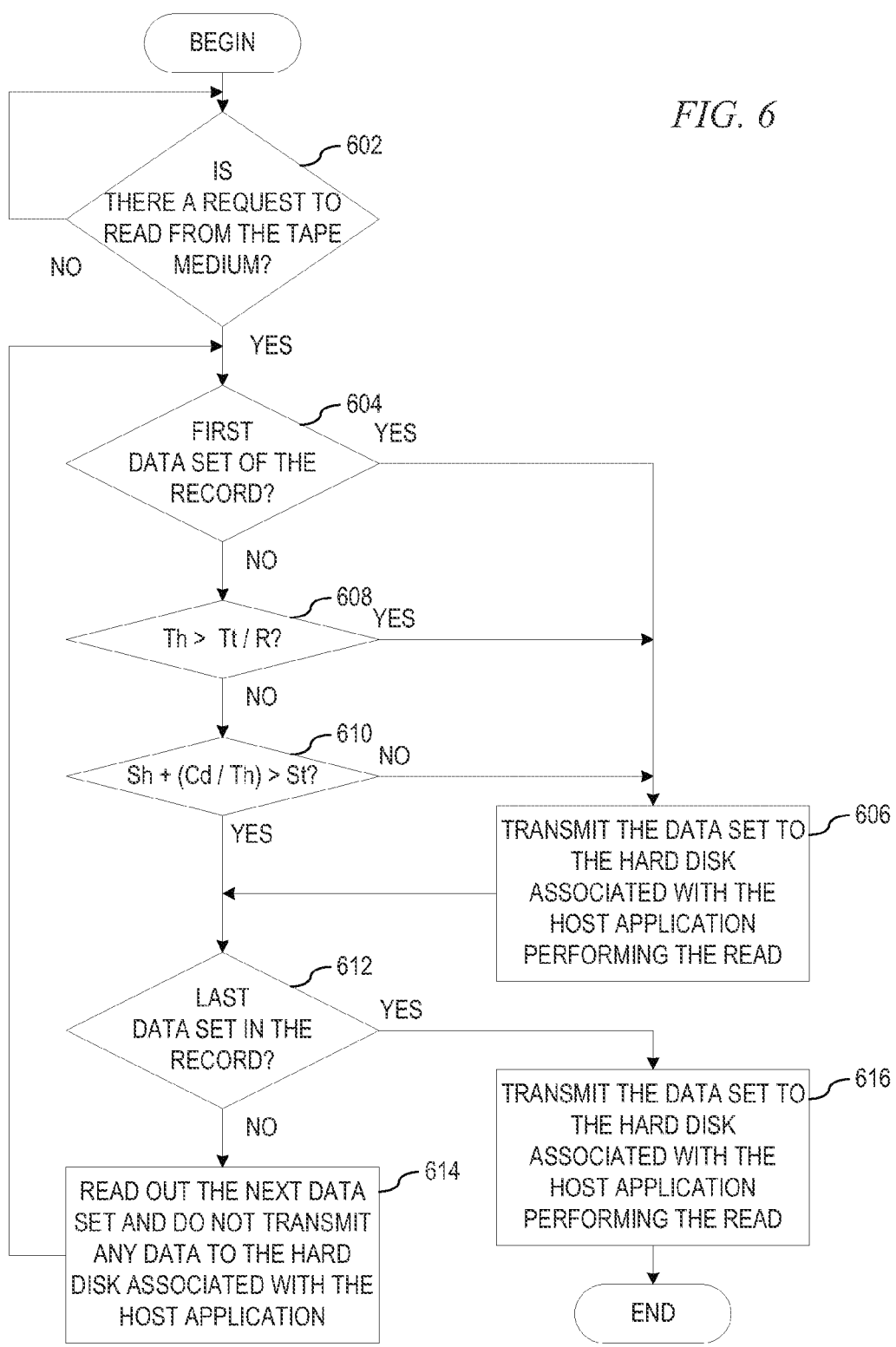
FIG. 6 depicts a flowchart of the operation performed by a tape management mechanism in determining a compression considered host side transfer rate (CCHSTR) in addition to a content of the data being read from the tape medium for each data set of a record in accordance with an illustrative embodiment.

FIG. 6 depicts a flowchart of the operation performed by a tape management mechanism in determining a compression considered host side transfer rate (CCHSTR) in addition to a content of the data being read from the tape medium for each data set of a record in accordance with an illustrative embodiment. As the operation begins, the tape management mechanism determines whether there is a request to read data from the tape medium (step 602). If at step 602 there fails to be a read of data from the tape medium, then the operation returns to step 602. If at step 602 there is read of data from the tape medium, then the tape management mechanism determines whether the data set associated with the record that is being read from the tape medium is the first data set of the record (step 604). If at step 604 the data set associated with the record that is being read from the tape medium is the first data set of the record, then the tape management mechanism transmits the data set to the hard disk associated with the host application performing the read (step 606). If at step 604 the data set associated with the record that is being read from the tape medium fails to be the first data set of the record, then the tape mechanism determines whether the rate of transfer by a hard disk (Th) is greater than the highest rate of transfer of data that cannot be compressed on the tape medium (Tt) divided by the ratio of data compression (R) for the particular data set (step 608) using the following equation:

$$Th > Tt/R.$$

If at step 608 the tape management mechanism determines that the rate of transfer by a hard disk (Th) is greater than the highest rate of transfer of data that cannot be compressed on the tape medium (Tt) divided by the ratio of data compression (R) for the particular data set, then the operation proceeds to step 606. If at step 608 the tape management mechanism determines that the rate of transfer by a hard disk (Th) is less than or equal to the highest rate of transfer of data that cannot be compressed on the tape medium (Tt) divided by the ratio of data compression (R) for the particular data set, then the tape management mechanism determines whether a maximum time of the seeking of data on the hard disk associated with the host application (Sh) when added to a capacity (volume) of data associated with a particular data set (Cd) divided by the rate of transfer by the hard disk (Th) is greater than a maximum time of the seeking of data by the tape drive reading the tape medium (St) (step 610) as is shown in the following equation:

$$Sh + (Cd/Th) > St.$$

If at step 610 the tape management mechanism determines that the maximum time of the seeking of data on the hard disk associated with the host application (Sh) when added to the capacity (volume) of data associated with a particular data set (Cd) divided by the rate of transfer by the hard disk (Th) is less than or equal to the maximum time of the seeking of data by the tape drive reading the tape medium (St), then the operation proceeds to step 606. If at step 610 the tape management mechanism determines that the maximum time of the seeking of data on the hard disk associated with the host application (Sh) when added to the capacity (volume) of data associated with a particular data set (Cd) divided by the rate of transfer by the hard disk (Th) is greater than a maximum time of the seeking of data by the tape drive reading the tape medium (St) or from step 606, the tape management mechanism determines whether the current data set is the last data set of the record (step 612). If at step 612 the current data set is not the last data set associated with the record, then the tape management mechanism reads out the next data set and does not transmit any data to the hard disk associated with the host application (step 614), with the operation returning to step 604 thereafter. If at step 612 the current data set is last data set associated with the record, then the tape management mechanism transmits the last data set to the hard disk associated with the host application performing the read (step 616), with the operation terminating thereafter.

Figure 7:
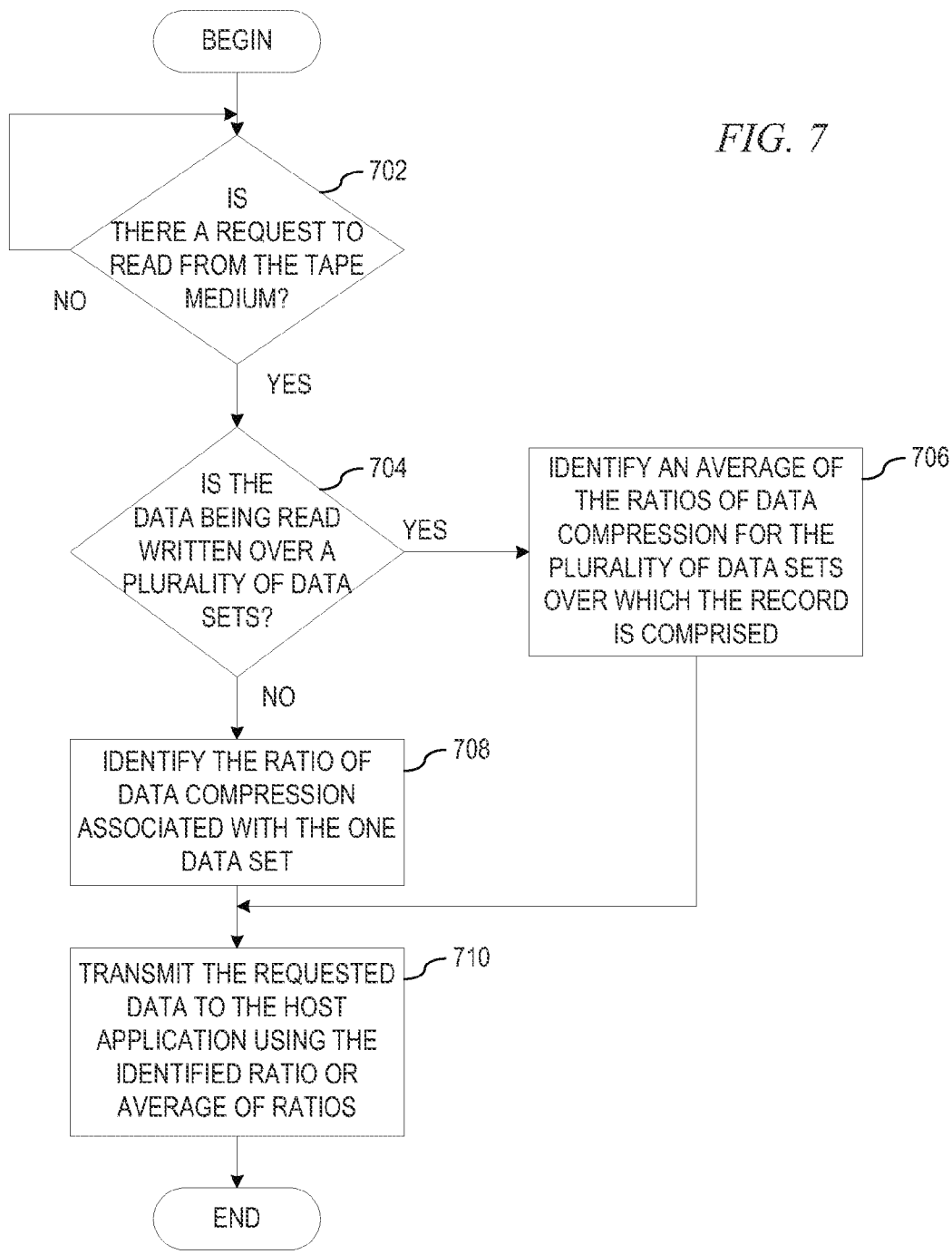
FIG. 7 depicts a flowchart of the operation performed by a tape management mechanism in determining a compression considered host side transfer rate (CCHSTR) for a set of data sets of a record in accordance with an illustrative embodiment.

FIG. 7 depicts a flowchart of the operation performed by a tape management mechanism in determining a compression considered host side transfer rate (CCHSTR) for a set of data sets of a record in accordance with an illustrative embodiment. As the operation begins, the tape management mechanism determines whether there is a request to read data from the tape medium (step 702). If at step 702 there fails to be a read of data from the tape medium, then the operation returns to step 702. If at step 702 there is read of data from the tape medium, then the tape management mechanism determines whether the data being read is written over a plurality of data sets (step 704). If at step 704 the data is written over a plurality of data sets, then tape management mechanism identifies an average of the ratios of data compression for the plurality of data sets over which the record is comprised (step 706). As discussed above with regard to FIG. 5, the tape management mechanism calculates a ratio of compression each time a data set of a record is written to the tape medium. Utilizing these values, the tape management logic keeps a running sum of the compression ratio values (Rs) as well as increments a size counter associated with the record that indicates a size (length) of the record (L). Once the tape management mechanism calculates and stores all of the individual ratios of data compression for all of the data sets associated with the record, the tape management mechanism determines a current average ratio of compression A for the record by dividing the sum of the compression ratio values (Rs) by the size of the record (L) as is shown in the following equation:

$$A = Rs/L$$

As the record is changed either by adding to or deleting data from the record, the tape management mechanism updates the average ratio of compression A by setting the current average ratio of compression to a temporary average ratio of compression (O), determining a size (length) of the data that is being added to (La) or deleted (Ld) from the current record, and the ratio of data compression (R) of the data that is being added or deleted. If data is being added, then the tape management mechanism determines a new current average ratio of compression A using the following formula:

$$A = (L*O + La*R)/(L + La).$$

If data is being deleted, then the tape management mechanism determines a new current average ratio of compression A using the following formula:

$$A = (L*O - Ld*R)/(L - Ld).$$

If at step 704 the data is not written over a plurality of data sets, then the tape management mechanism identifies the ratio of data compression associated with the one data set (step 708). Once the tape management mechanism identifies an average of the ratios of data compression for the plurality of data sets over which the record is comprised in step 706 or the ratio of data compression associated with the one data set in step 708, the tape management mechanism utilizes the identified average of the ratios of data compression for the plurality of data sets or the identified ratio of data compression associated with the one data set for transmitting the requested data to the host application (step 710), with the operation ending thereafter.

Figure 8:
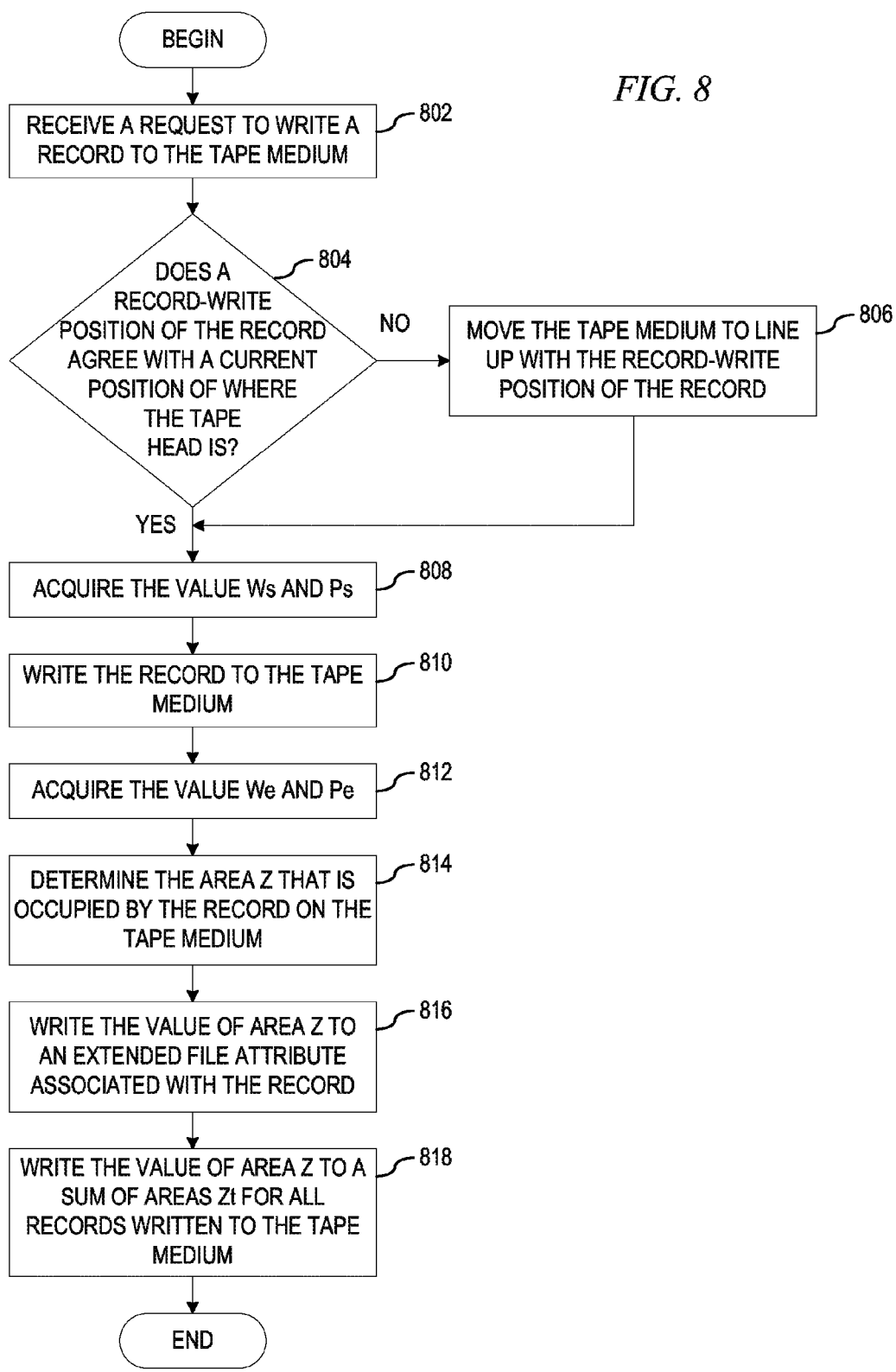
FIG. 8 depicts a flowchart of the operation performed by a tape management mechanism in determining a utilized area of a tape medium in accordance with an illustrative embodiment.

FIG. 8 depicts a flowchart of the operation performed by a tape management mechanism in determining a utilized area of a tape medium in accordance with an illustrative embodiment. As the operation begins, the tape management mechanism receives a request to write a record to the tape medium (step 802). The tape management mechanism determines whether a record-write position of the record agrees with a current position of where the tape head of the tape drive that is reading the tape medium (step 804). If at step 804 the record-write position of the record fails to agree with a current position of where the tape head of the tape drive that is reading the tape medium, then the tape management mechanism issues a command to move the tape medium to line up with the record-write position of the record (step 806).

From step 806 of if at step 804 the record-write position of the record agrees with a current position of where the tape head of the tape drive that is reading the tape medium, the tape management mechanism executes a Request Sense command to acquire the value of the wrap of the head (start) of the record (Ws) and the lpos of the head (start) of the record (Ps) (step 808). The tape management mechanism then causes the record to be written to the tape medium using a sync command (Write Filemark) so that data is written from the buffer memory to the tape medium (step 810). Once the record is written to the tape medium, the tape management mechanism executes a Request Sense command to acquire the value of the wrap of the tail (end) of the record (We) and the lpos of the tail (end) of the record (Pe) (step 812). With these values, the tape management mechanism determines the area Z that is occupied by the record on the tape medium (step 814) using the following set of equations:

If $Ws=We$, then $Z=|Pe-Ps|$

If $Ws \neq We$, then $Z=|f(Ws)-Ps|+|f(We)-Pe|+(f(0)-f(1))*(We-Ws-1)$ where f(Ws) is a function of the starting wrap position, f(We) is a function of the ending wrap position, f(0) is a function that returns the longitudinal position (lpos) corresponding to a beginning position on the tape medium when x is an even number, and f(1) is a function that returns the longitudinal position (lpos) corresponding to an end position on the tape medium when x is an odd number. The tape management mechanism then writes the value of area Z to an extended file attribute associated with the record (step 816) as well as writing the value of area Z to a sum of areas Zt for all records written to the tape medium (step 818), with the operation ending thereafter.

Figure 9:
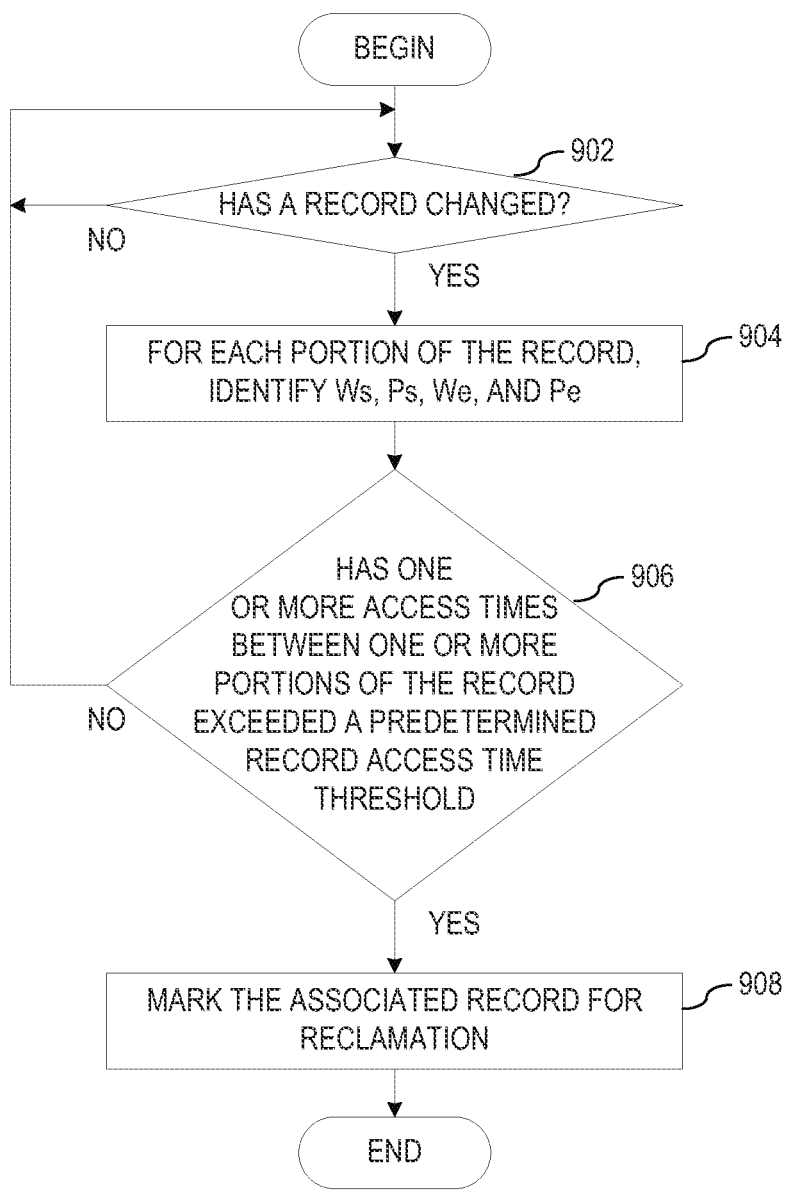
FIG. 9 depicts a flowchart of the operation performed by a tape management mechanism in determining where to perform reclamation of a file on a tape medium in accordance with an illustrative embodiment.

FIG. 9 depicts a flowchart of the operation performed by a tape management mechanism in determining where to perform reclamation of a file on a tape medium in accordance with an illustrative embodiment. As the operation begins, the tape management mechanism determines whether a record has changed either through adding of data and/or deletion of data (step 902). If at step 902 the tape management mechanism determines that the record has not changed, then the operation returns to step 902. If at step 902 the tape management mechanism determines that the record has changed, then the tape management mechanism identifies, for each portion of the record, a wrap of the head (start) of the portion (Ws), a lpos of the head (start) of the portion (Ps), a wrap of the tail (end) of the portion (We), and the lpos of the tail (end) of the portion (Pe) (step 904). Utilizing these values, the tape management mechanism determines whether one or more access times between one or more portions of the record exceed a predetermined record access time threshold (step 906). That is, with regard to a single record, the tape management mechanism determines whether the time between the end of one portion and the beginning of another portion for each of the portions indicates that the access time for each of the portions of the record is greater than the predetermined record access time threshold. If at step 906 the one or more access times between one or more portions of the record fail to exceed a predetermined record access time threshold, then the operation returns to step 902. If at step 906 the one or more access times between one or more portions of the record exceed the predetermined record access time threshold, then the tape management mechanism marks the associated record for reclamation (step 908), with the operation terminating thereafter.

Figure 10:
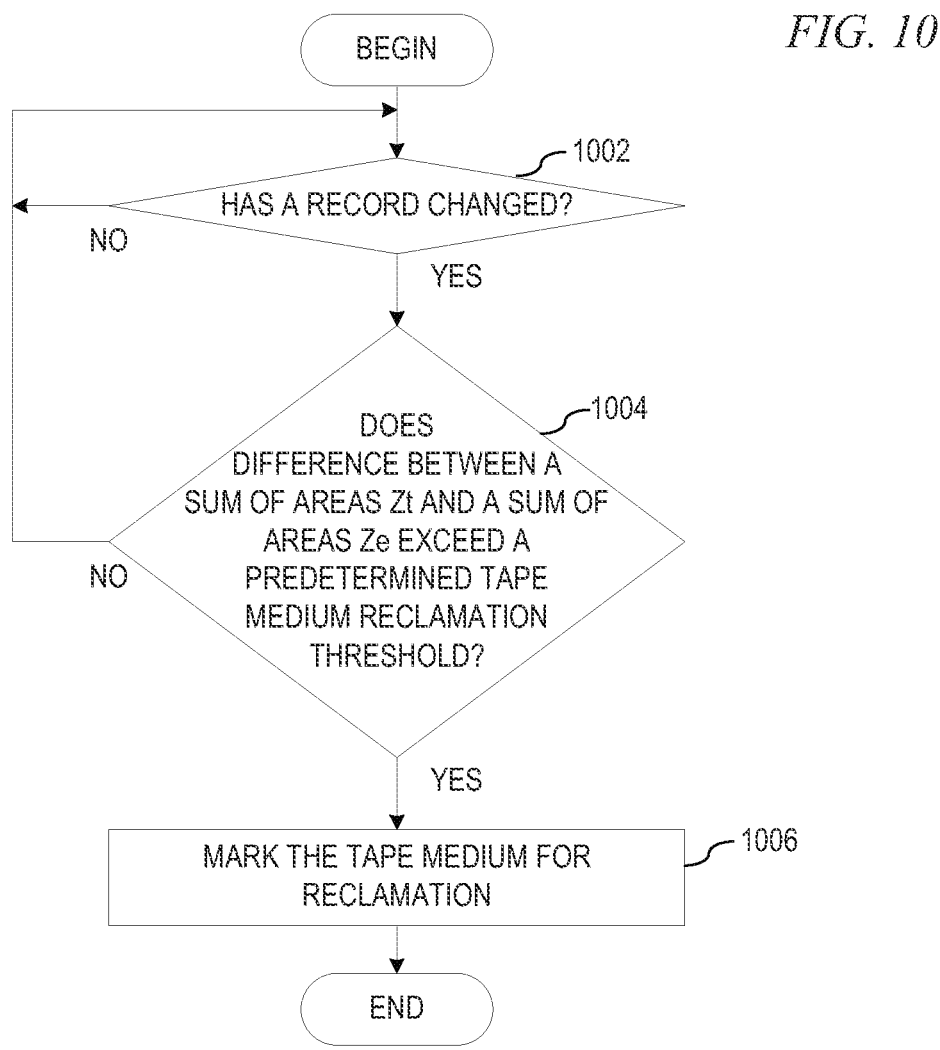
FIG. 10 depicts a flowchart of the operation performed by a tape management mechanism in determining where to perform reclamation of a file on a tape medium of the entire tape medium itself in accordance with an illustrative embodiment.

FIG. 10 depicts a flowchart of the operation performed by a tape management mechanism in determining where to perform reclamation of a file on a tape medium of the entire tape medium itself in accordance with an illustrative embodiment. As the operation begins, the tape management mechanism determines whether a record has been added, changed, or deleted (step 1002). If at step 1002 no record has been added, changed, or deleted, then the operation returns to step 1002. If at step 1002 a record has been added, changed, or deleted, then the tape management mechanism determines whether a difference between a sum of areas Zt for all records written to the tape medium and a sum of areas Ze for all records deleted from the tape medium exceeds a predetermined tape medium reclamation threshold (step 1004). That is, there may be a point where the amount of data deleted from the tape medium overly exceeds the amount of data remaining on the tape medium as determined by their respective areas. If at step 1004 the sum of areas Zt for all records written to the tape medium and the sum of areas Ze for all records deleted from the tape medium fails to exceed the predetermined tape medium reclamation threshold, then the operation returns to step 1002. However, if at step 1004 the sum of areas Zt for all records written to the tape medium and the sum of areas Ze for all records deleted from the tape medium exceed the predetermined tape medium reclamation threshold, then the tape management mechanism marks the tape medium as a whole for a reclamation process, where all remaining files on the tape medium are written to a new tape medium (step 1006), with the operation terminating thereafter.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for determining a running speed for a tape medium based on a ratio of data compression, a content of data comprising the record, and an average of the ratios of data compression for those data sets that make up a particular file. The illustrative embodiments also provide for identifying a record to be reclaimed in response to one or more access times of the data associated with the record becoming too great. Finally, the illustrative embodiments also provide for identifying tape medium that needs to be reclaimed in response to records deleted from the tape medium exceeding a predetermined threshold.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:
    identify a bandwidth (B) between a storage device accessing storage medium and a host application requesting access to data on the storage medium;
    identify a host side transfer rate, wherein the host side transfer rate (HSTR) is a rate of data transferred between the host application and the storage device; and
    for each data set in a set of data sets of a record:
        identify a ratio of data compression (R) for the data set;
        determine a compression considered host side transfer rate (CCHSTR), wherein the compression considered host side transfer rate (CCHSTR) is determined utilizing: CCHSTR=max (B, HSTR/R); and
        set a storage device speed to the compression considered host side transfer rate (CCHSTR) for transmitting the data set to the host application.

2. The computer program product of claim 1, wherein the ratio of data compression (R) for the data set is determined by the computer readable program further causing the computing device to:
    compare a data length of the data set before compression to a data length of the data set after compression during a writing of the record to the storage medium, wherein the comparison forms the ratio of data compression (R) for the data set.

3. The computer program product of claim 1, wherein the computer readable program further causes the computing device to:
    for each data set in the set of data sets of a record:
        determine whether the data set is the first data set of the record; and
        responsive to the data set being the first data set of the record, transmit the data set to the host application at the compression considered host side transfer rate (CCHSTR).

4. The computer program product of claim 3, wherein the computer readable program further causes the computing device to:
    responsive to the data set failing to be the first data set of the record, determine whether a rate of transfer by a hard disk (Th) associated with the host application is greater than the highest rate of transfer of data that cannot be compressed on the storage medium (Tt) divided by the ratio of data compression (R) for the data set using:

$Th>Tt/R$; and responsive to Th being greater than Tt/R, transmit the data set to the host application at the compression considered host side transfer rate (CCHSTR).

5. The computer program product of claim 4, wherein the computer readable program further causes the computing device to:
    responsive to Th being less than or equal to Tt/R, determine whether a maximum time of seeking of data on the hard disk associated with the host application (Sh) when added to a capacity (volume) of data associated with a particular data set (Cd) divided by the rate of transfer by the hard disk (Th) is greater than a maximum time of seeking of data by the storage device reading the tape medium (St) using:

$Sh+(Cd/Th)>St;$ responsive to Sh+(Cd/Th) being less than or equal to St, transmit the data set to the host application at the compression considered host side transfer rate (CCHSTR); and
    responsive to Sh+(Cd/Th) being greater than St, read out a next data set and repeat the process.

6. The computer program product of claim 1, wherein the computer readable program further causes the computing device to:
    determine whether the record being read is written over a plurality of data sets;
    responsive to the record being read being written over the plurality of data sets, identify an average of the ratios of data compression for the plurality of data sets (A) over which the record is written; and
    utilize the identified average of the ratios of data compression for the plurality of data sets (A) for transmitting the plurality of data sets to the host application.

7. The computer program product of claim 6, wherein the average of the ratios of data compression for the plurality of data sets is increased when data is added to the record using:

$A=(L*O+La*R)/(L+La)$ where A is the average of ratios of data compression for the plurality of data sets, L is a size (length) of the record, O is a previous average of ratios of data compression for the plurality of data sets, R is a ratio of data compression (R) of the data that is being added, and La is a size (length) of the data that is being added.

8. The computer program product of claim 6, wherein the average of the ratios of data compression for the plurality of data sets is decreased when data is deleted from the record using:

$$A=(L*O-Ld*R)/(L-Ld)$$

where A is the average of ratios of data compression for the plurality of data sets, L is a size (length) of the record, O is a previous average of ratios of data compression for the plurality of data sets, R is a ratio of data compression (R) of the data that is being added, and Ld is a size (length) of the data that is being deleted.

9. The computer program product of claim 1, wherein the computer readable program further causes the computing device to:
    determine whether the record has changed either through adding of data and/or deletion of data thereby breaking the record into one or more portions;
    responsive to the record changing, identify for each portion of the one or more portions of the record a wrap of a head (start) of the portion (Ws), a lpos of the head (start) of the portion (Ps), a wrap of a tail (end) of the portion (We), and the lpos of the tail (end) of the portion (Pe);
    utilize the identified values, determining whether one or more access times between the one or more portions of the record exceed a predetermined record access time threshold; and
    responsive to one or more access times between the one or more portions of the record exceeding the predetermined record access time threshold, mark the record for reclamation.

10. The computer program product of claim 1, wherein the computer readable program further causes the computing device to:
    determine whether one or more records have changed either through adding of data and/or deletion of data;
    responsive to one or more records changing, determine whether a difference between a sum of areas Zt for all records written to the tape medium and a sum of areas Ze for all records deleted from the tape medium exceeds a predetermined tape medium reclamation threshold; and
    responsive to the difference between the sum of areas Zt for all records written to the tape medium and the sum of areas Ze for all records deleted from the tape medium exceeding the predetermined tape medium reclamation threshold, mark the storage medium as a whole for reclamation.

11. A method, in a data processing system, for determining storage device speed based on a ratio of data compression, the method comprising:
    identifying a bandwidth (B) between a storage device accessing storage medium and a host application requesting access to data on the storage medium;
    identifying a host side transfer rate, wherein the host side transfer rate (HSTR) is a rate of data transferred between the host application and the storage device; and
    for each data set in a set of data sets of a record:
        identifying the ratio of data compression (R) for the data set;
        determining a compression considered host side transfer rate (CCHSTR), wherein the compression considered host side transfer rate (CCHSTR) is determined utilizing: CCHSTR=max (B, HSTR/R); and
        setting the storage device speed to the compression considered host side transfer rate (CCHSTR) for transmitting the data set to the host application.

12. The method of claim 11, wherein the ratio of data compression (R) for the data set is determined by the method comprising:
    comparing a data length of the data set before compression to a data length of the data set after compression during writing of the record to the storage medium, wherein the comparison forms the ratio of data compression (R) for the data set.

13. The method of claim 11, further comprising:
    for each data set in the set of data sets of a record:
    determining whether the data set is the first data set of the record;
    responsive to the data set being the first data set of the record, transmitting the data set to the host application at the compression considered host side transfer rate (CCHSTR);
    responsive to the data set failing to be the first data set of the record, determining whether a rate of transfer by a hard disk (Th) associated with the host application is greater than the highest rate of transfer of data that cannot be compressed on the storage medium (Tt) divided by the ratio of data compression (R) for the data set using:

$$Th>Tt/R,$$

responsive to Th being greater than Tt/R, transmitting the data set to the host application at the compression considered host side transfer rate (CCHSTR);
    responsive to Th being less than or equal to Tt/R, determining whether a maximum time of seeking of data on the hard disk associated with the host application (Sh) when added to a capacity (volume) of data associated with a particular data set (Cd) divided by the rate of transfer by the hard disk (Th) is greater than a maximum time of seeking of data by the storage device reading the tape medium (St) using:

$$Sh+(Cd/Th)>St;$$

responsive to Sh+(Cd/Th) being less than or equal to St, transmitting the data set to the host application at the compression considered host side transfer rate (CCHSTR); and
    responsive to Sh+(Cd/Th) being greater than St, reading out a next data set and repeating the process.

14. The method of claim 11, further comprising:
    determining whether the record being read is written over a plurality of data sets;
    responsive to the record being read being written over the plurality of data sets, identifying an average of the ratios of data compression for the plurality of data sets (A) over which the record is written; and
    utilizing the identified average of the ratios of data compression for the plurality of data sets (A) for transmitting the plurality of data sets to the host application, wherein the average of the ratios of data compression for the plurality of data sets is increased when data is added to the record using:

$$A=(L*O+La*R)/(L+La)$$

where A is the average of ratios of data compression for the plurality of data sets, L is a size (length) of the record, O is a previous average of ratios of data compression for the plurality of data sets, R is a ratio of data compression (R) of the data that is being added, and La is a size (length) of the data that is being added and wherein the average of the ratios of data compression for the plurality of data sets is decreased when data is deleted from the record using:

$$A=(L*O-Ld*R)/(L-Ld)$$

where A is the average of ratios of data compression for the plurality of data sets, L is a size (length) of the record, O is a previous average of ratios of data compression for the plurality of data sets, R is a ratio of data compression (R) of the data that is being added, and Ld is a size (length) of the data that is being deleted.

15. The method of claim 11, further comprising;
determining whether the record has changed either through adding of data and/or deletion of data thereby breaking the record into one or more portions;
responsive to the record changing, identifying for each portion of the one or more portions of the record a wrap of a head (start) of the portion (Ws), a lpos of the head (start) of the portion (Ps), a wrap of a tail (end) of the portion (We), and the lpos of the tail (end) of the portion (Pe);
utilizing the identified values, determining whether one or more access times between the one or more portions of the record exceed a predetermined record access time threshold; and
responsive to one or more access times between the one or more portions of the record exceeding the predetermined record access time threshold, marking the record for reclamation.

16. The method of claim 11, further comprising:
determining whether one or more records have changed either through adding of data and/or deletion of data;
responsive to one or more records changing, determining whether a difference between a sum of areas Zt for all records written to the tape medium and a sum of areas Ze for all records deleted from the tape medium exceeds a predetermined tape medium reclamation threshold; and
responsive to the difference between the sum of areas Zt for all records written to the tape medium and the sum of areas Ze for all records deleted from the tape medium exceeding the predetermined tape medium reclamation threshold, marking the storage medium as a whole for reclamation.

17. An apparatus comprising:
a processor; and
a memory coupled to the processor, wherein the memory comprises instructions which, when executed by the processor, cause the processor to:
identify a bandwidth (B) between a storage device accessing storage medium and a host application requesting access to data on the storage medium;
identify a host side transfer rate, wherein the host side transfer rate (HSTR) is a rate of data transferred between the host application and the storage device; and
for each data set in a set of data sets of a record:
identify a ratio of data compression (R) for the data set;
determine a compression considered host side transfer rate (CCHSTR), wherein the compression considered host side transfer rate (CCHSTR) is determined utilizing: CCHSTR=max (B, HSTR/R); and
set a storage device speed to the compression considered host side transfer rate (CCHSTR) for transmitting the data set to the host application.

18. The apparatus of claim 17, wherein the ratio of data compression (R) for the data set is determined by the instructions further causing the processor to:
compare a data length of the data set before compression to a data length of the data set after compression during a writing of the record to the storage medium, wherein the comparison forms the ratio of data compression (R) for the data set.

19. The apparatus of claim 17, wherein the instructions further cause the processor to:
for each data set in the set of data sets of a record:
determine whether the data set is the first data set of the record;
responsive to the data set being the first data set of the record, transmit the data set to the host application at the compression considered host side transfer rate (CCHSTR);
responsive to the data set failing to be the first data set of the record, determine whether a rate of transfer by a hard disk (Th) associated with the host application is greater than the highest rate of transfer of data that cannot be compressed on the storage medium (Tt) divided by the ratio of data compression (R) for the data set using:

$$Th>Tt/R;\text{ and}$$

responsive to Th being greater than Tt/R, transmit the data set to the host application at the compression considered host side transfer rate (CCHSTR);
responsive to Th being less than or equal to Tt/R, determine whether a maximum time of seeking of data on the hard disk associated with the host application (Sh) when added to a capacity (volume) of data associated with a particular data set (Cd) divided by the rate of transfer by the hard disk (Th) is greater than a maximum time of seeking of data by the storage device reading the tape medium (St) using:

$$Sh+(Cd/Th)>St;$$

responsive to Sh+(Cd/Th) being less than or equal to St, transmit the data set to the host application at the compression considered host side transfer rate (CCHSTR); and
responsive to Sh+(Cd/Th) being greater than St, read out a next data set and repeat the process.

20. The apparatus of claim 17, wherein the instruction further cause the processor to:
determine whether the record being read is written over a plurality of data sets;
responsive to the record being read being written over the plurality of data sets, identify an average of the ratios of data compression for the plurality of data sets (A) over which the record is written; and
utilize the identified average of the ratios of data compression for the plurality of data sets (A) for transmitting the plurality of data sets to the host application, wherein the average of the ratios of data compression for the plurality of data sets is increased when data is added to the record using:

$$A=(L*O+La*R)/(L+La)$$

where A is the average of ratios of data compression for the plurality of data sets, L is a size (length) of the record, O is a previous average of ratios of data compression for the plurality of data sets, R is a ratio of data compression (R) of the data that is being added, and La is a size (length) of the data that is being added and wherein the average of the ratios of data compression for the plurality of data sets is decreased when data is deleted from the record using:

$$A=(L*O-Ld*R)/(L-Ld)$$

where A is the average of ratios of data compression for the plurality of data sets, L is a size (length) of the record, O is a previous average of ratios of data compression for the plurality of data sets, R is a ratio of data compression (R) of the data that is being added, and Ld is a size (length) of the data that is being deleted.

* * * * *